April 22, 1930. H. S. HELE-SHAW ET AL 1,755,670
FURNITURE AND LIKE CASTER
Filed March 12, 1925   3 Sheets-Sheet 1

INVENTORS:
HENRY S. HELE-SHAW
THOMAS E. BEACHAM by Spear, Middleton, Donaldson & Hall
Attys.

April 22, 1930.   H. S. HELE-SHAW ET AL   1,755,670
FURNITURE AND LIKE CASTER
Filed March 12, 1925   3 Sheets-Sheet 2
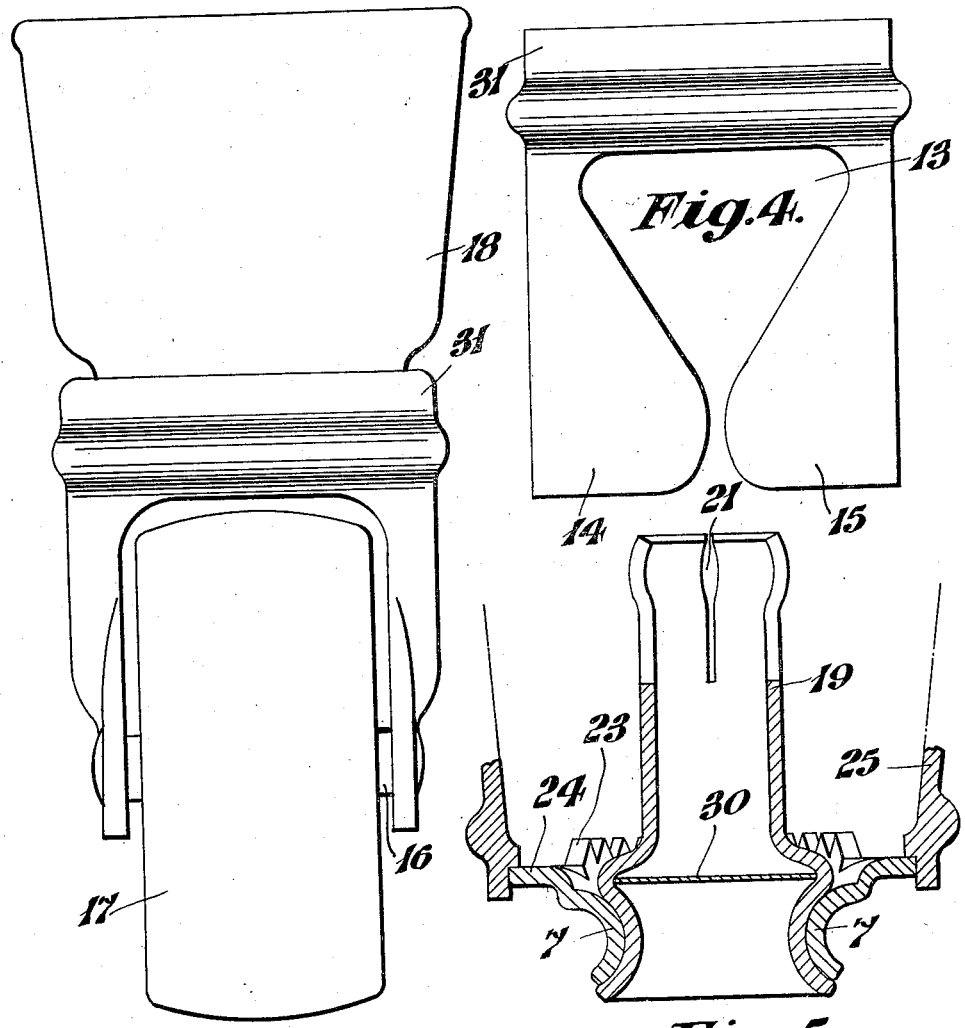
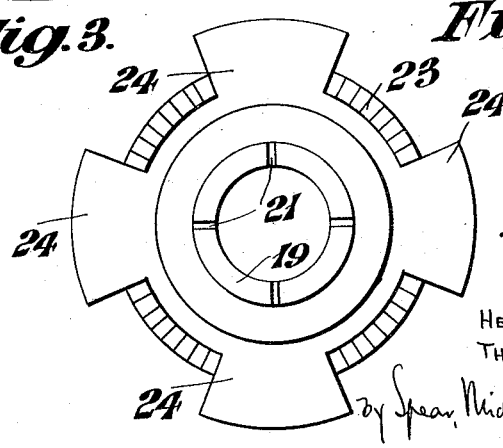

April 22, 1930.  H. S. HELE-SHAW ET AL  1,755,670
FURNITURE AND LIKE CASTER
Filed March 12, 1925   3 Sheets-Sheet 3
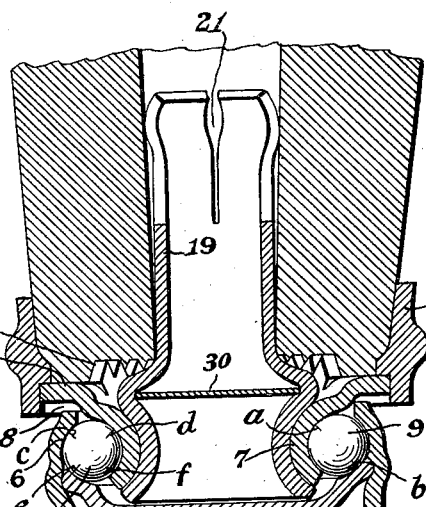
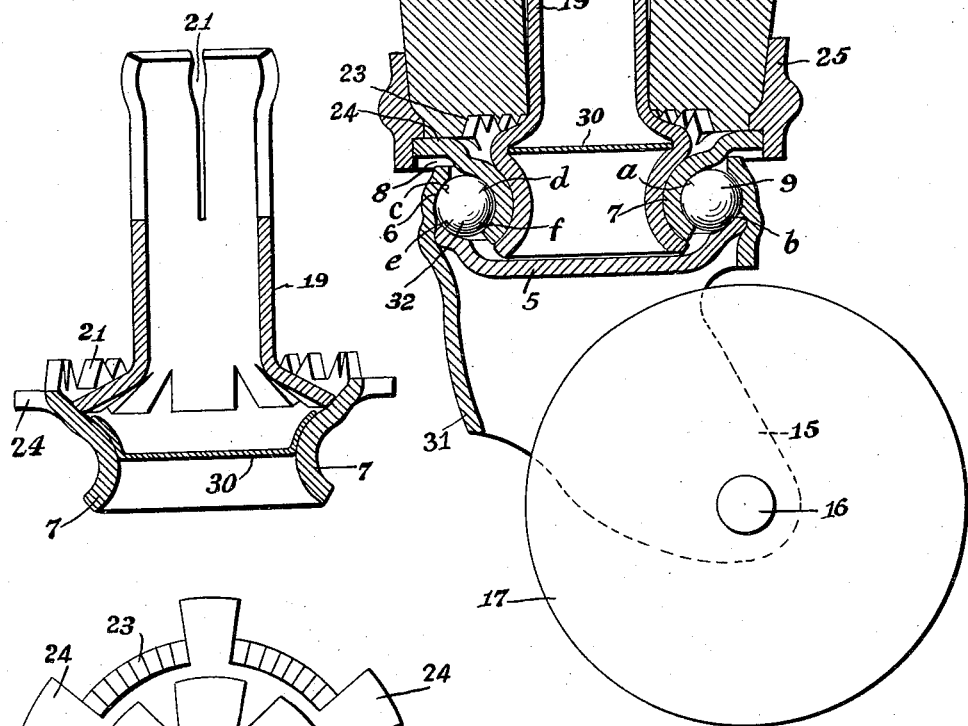
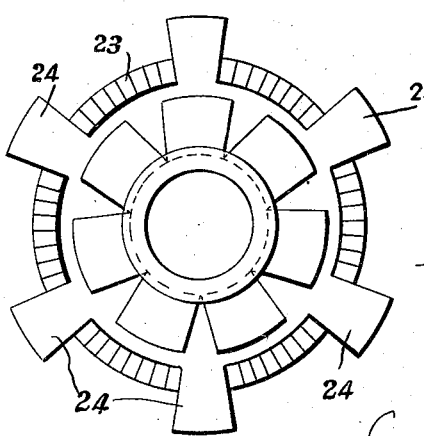
Inventors.
HENRY S. HELE-SHAW
THOMAS E. BEACHAM
by Spear, Middleton, Donaldson, Hall
Attys.

Patented Apr. 22, 1930

1,755,670

UNITED STATES PATENT OFFICE

HENRY SELBY HELE-SHAW AND THOMAS EDWARD BEACHAM, OF LONDON, ENGLAND

FURNITURE AND LIKE CASTER

Application filed March 12, 1925, Serial No. 14,907, and in Great Britain August 27, 1924.

This invention relates to casters having a ball bearing for its vertical or swivelling axis, and has for its object to provide an improved construction of this type of caster wherein the easy running and accurate rolling of the balls in their races is secured. The mechanical difficulty in any caster of this type is to obtain a vertical pivot or axis of sufficient length to obviate the binding effect caused by the unavoidable twisting action when the caster carries a load. There is also the difficulty of securing sufficient diameter of the vertical pin to ensure strength, unless the pivot is made inconveniently long so as to avoid the locking of the vertical pivot in its bearing.

According to the present invention the ball races of the swivelling axis are not made as heretofore with the transverse radius of the section of the race of the same radius as the balls, but with a greater radius, so that the bearing of the balls on the races will be substantially along circular lines, that is not on surfaces of any great width.

Another feature of the invention is the provision of a grease retaining cup below the ball races and extending across the swivelling or roller carrying portion of the caster.

A further feature of the invention is the construction of a swivelling caster wherein the whole of the stresses in all directions are taken up by the balls in the races and none of them taken up by the sides of the swivelling socket.

Figure 1:
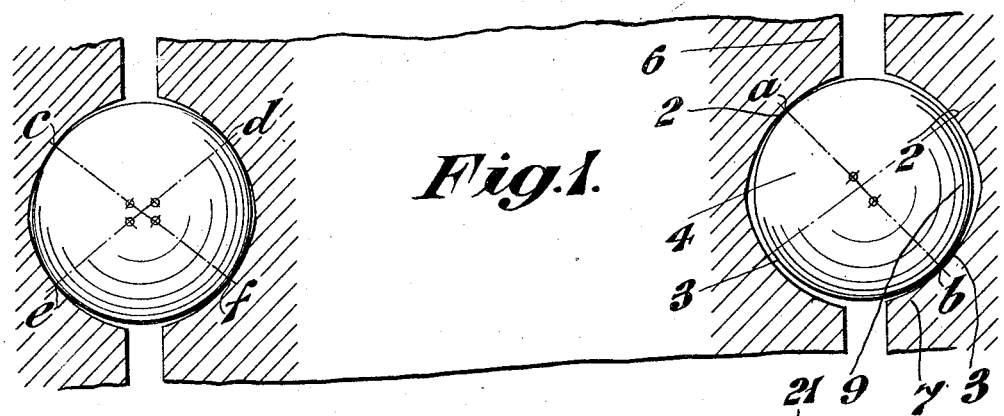
Figure 2:
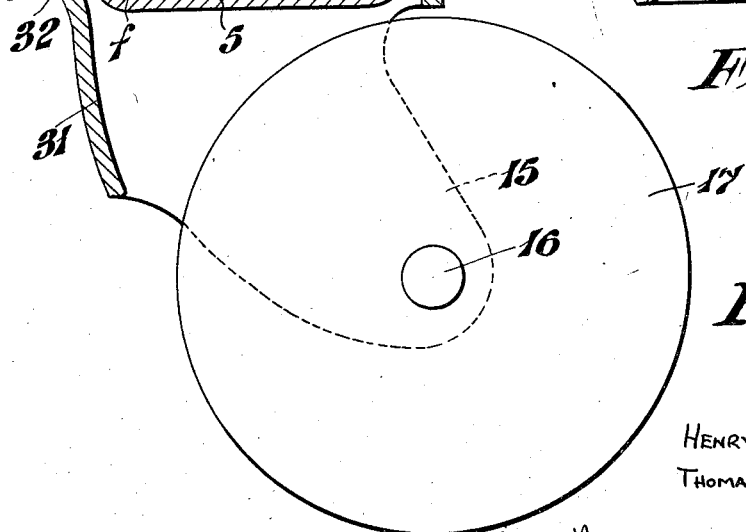

The invention is illustrated by the accompanying drawings wherein Figure 1 is a diagrammatic sectional view illustrating the principle of construction of the concave surfaces of the ball races, Figure 2 a sectional view of a caster made in accordance with the invention, Fig. 3 a front view of Figure 2, Fig. 4 a detail of Figure 2, Fig. 5 a sectional view of a modified construction of the fixing member of the caster carrying the fixed ball race.

Figure 9:
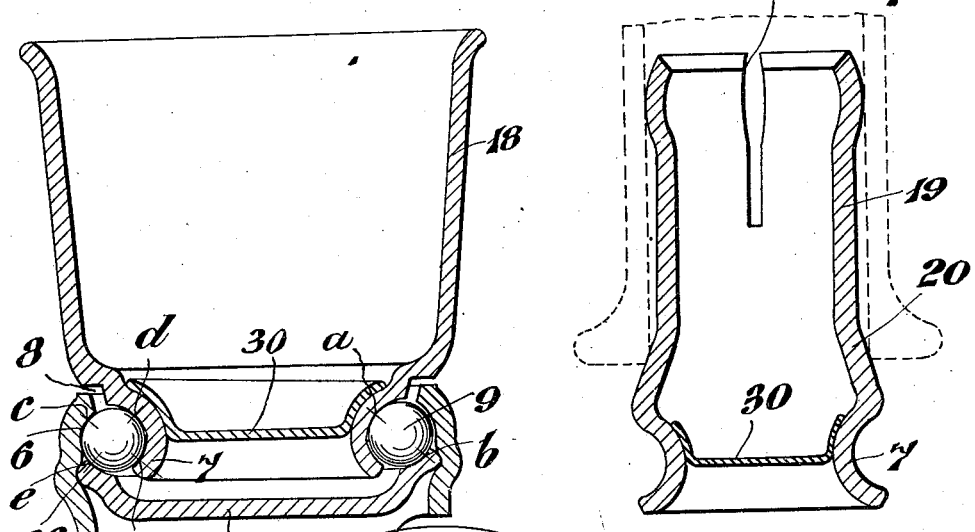

Figure 6 a plan of Figure 5,

Figure 7 a sectional view of a further modification of the fixing member carrying the fixed ball race, Figure 8 a plan of Figure 7, Figure 9 a sectional view of another modification of the fixing member carrying the fixed ball race, Fig. 10 a sectional view of an alternative construction of the caster.

According to the present invention the bearing surface of each race 6 and 7 consists of two quadrants 2 and 3 as shown in Fig. 1, the centres of the quadrants making with the centre of the ball 9 angles of 45° with the horizontal. While it is not necessary that these angles should be 45° it is necessary that they should be both at the same angle to the horizontal in order that the ball may touch at two points on the race which are in the same vertical plane and so avoid rubbing as the race rotates round a vertical axis. It will be seen that by this construction the distance 4 between the points of contact of the balls with the races is the same no matter in which direction the ball is required to transmit its thrust and that therefore all differential speed of the balls is eliminated. Further it will be noted that radial and vertical clearance are approximately equal thereby remedying jamming.

By reason of the construction shown in this figure and the fact that the load on the roller is never coaxial with the swivelling axis, the balls at the side of the bearing immediately above the roller take up a bearing at two points $a$ and $b$ one in each race 6 and 7 while the balls at the opposite side of the bearing take up a bearing at four points $c$, $d$, $e$ and $f$ two in each race 6 and 7.

The fixing member of the caster may be a cup 18 as shown in Figures 2 and 3 for fitting on the leg of a piece of furniture or the like, or it may be a tube 19 as shown in Figures 5, 7 and 9 for fitting in a hole in the support of the furniture or in the tubular support of a bedstead or the like.

The swivelling or roller carrying member of the caster may be a tubular member 31 as shown in Figures 2 and 3.

A feature common to each modification illustrated is the provision of a grease cup 5 in which the balls roll and a small circular gap 8 between the two races 6 and 7 which is the only place at which the atmosphere can communicate with the chamber containing the balls. The grease cup 5 is filled with oil or grease when the caster is made so that as the balls 9 roll they get covered with this lubricant and as there is no passage through for air to circulate the grease does not get oxidized by the atmosphere. Dirt is prevented from entering by the fineness of the gap 8 between the two races but as an additional prevention in all cases the top race 7 is turned over horizontally just above the vertical gap making the gap in cross section the shape of an inverted letter L.

In the case of casters in which at least one race is made of sheet metal as shown in Figures 5 to 9 the balls may be inserted before one of the races is completely formed and the incomplete race then finished with the balls in place. This may be done either by pressing or spinning.

In every case it is necessary to provide the caster with a wheel of sufficient diameter to travel easily over carpet or other roughnesses on the floor which it may encounter and to displace the wheel at a sufficient distance from the vertical axis of the caster to enable the caster to trail promptly. On the other hand the races being circular the natural easy thing to do in the case of pressed metal casters is to make the lower half approximately in the form of a tube. Now it is a practical impossibility to fit the caster wheel or roller within the tube without making the wheel too small or the tube too large and this difficulty is overcome by making the wheel pass through the sides of the tube. One method of doing this is to pierce a hole 13 in the tube (see Fig. 4) approximately triangular in shape and to bend outwards the two cheeks 14 and 15 thus formed which may then be drilled to support the axle 16 of the caster wheel or roller 17.

The upper portions of casters must be such as to easily fit the legs or other portions of the furniture which they are to support. We therefore make one form in the shape of a cylinder 18 or 19 with a ball race 7 as described at its lower extremity. The cylinder may be slightly conical to fit outside a wooden table leg, see Figure 2, or, as in Figures 5, 7 and 9 to fit within a circular hole, and may be constructed with a conical portion 20 see Fig. 9 just above the ball race to jam into the hole and may have its upper extremity slit at 21 and splayed out to act as a spring to hold it in position. The top ball race may be fitted with prongs 23 see Figs. 5 to 8 which turn up and bite into the furniture to prevent the top half rotating, and in conjunction with the prongs 23 there may be a flat circular or partly circular portion 24 to support a ring 25 see Fig. 5 fitting round the outside of a leg of the furniture.

In the construction shown in Figure 2 the upper cup 18 is provided with a disc or cup 30 fitting tightly in the restricted portion formed by the race 7, and serving to prevent any dirt that may have accumulated in the cup 18 from falling into the grease cup 5, a similar dirt cup or disc 30 is provided in Figures 5, 7 and 9.

In this example the outer race 6 is formed partly on the roller carrying tube 31 and partly on the edge of the grease cup 5, the edges of the latter fitting tightly in a groove 32 provided in the inner surface of the tube 31. In Fig. 10 the fixing member of Fig. 5 is combined with the swivelling member of Fig. 2.

What we claim and desire to secure by Letters Patent is:—

1. A roller caster having a ball bearing on its vertical axis, a fixing member carrying one of the races of the ball bearing, a swivelling member carrying the roller and the other race of the ball bearing, each race of the ball bearing consisting of a two-sided groove, the two races being of such a size that they will not engage all the balls at four points, those immediately above the roller being engaged at two points and those at diametrically opposite points in the race being engaged at four points.

2. A roller caster in accordance with claim 1, wherein the ball races are of different diameters and each side of each two-sided groove in the ball races is curved to a radius greater than that of the balls of the bearing and the ball races are of such a size as not to form a four point bearing on all the balls simultaneously.

3. A roller caster having a ball bearing on its vertical axis, a fixing cup at the lower end of which is formed a two-sided grooved ball race, and a tubular swivelling member carrying the roller and in the upper end of which is formed a two-sided grooved ball race oppositely disposed and of a different diameter to that in the fixing cup, each side of each two-sided groove in the ball races being curved to a radius greater than that of the balls of the bearing.

4. A roller caster having a ball bearing on its vertical axis and comprising a grease cup, a fixing member at the lower end of which is formed the inner race of the ball bearing, and a swivelling member consisting of a tubular member having at the inside of its upper end the other race of the ball bearing, the grease cup having its upper edge above the lower portion of the balls being fixed in the swivelling member in such a position immediately under the balls that they will extend into the grease therein.

5. A roller caster having a ball bearing on its vertical axis and comprising, a grease cup, a fixing member having at its lower end one of the races of the ball bearing, and a hollow swivelling member having the other race of the ball bearing at its upper end, the grease cup having its upper edge above the lower portion of the balls being held by its edges extending into a groove formed in the swivelling member in such a position as to hold the grease cup with the grease therein in contact with the balls.

6. A roller caster comprising a roller, a member in which said roller is rotatably carried, a ball race having a two-sided groove consisting of three annular parts two of which carrying the respective grooves and are carried by said roller carrying member, a fixing member for enabling the caster to be fixed to the furniture and on the periphery of which is formed the third annular part of the ball race, balls in the ball race to form a ball bearing, the curvature of the partial ball races being such as to ensure point contact of the balls in the ball race, and a lubrication space between the bottom face of the fixing member and the top face of the roller carrying member.

In witness whereof we affix our signatures.

HENRY SELBY HELE-SHAW.
THOMAS EDWARD BEACHAM.